United States Patent [19]
Oosterling et al.

[11] 3,861,600
[45] Jan. 21, 1975

[54] SPREADING DEVICE COMPRISING A RECIPROCATORY SWINGING DISTRIBUTION PIPE

[75] Inventors: Pieter Adriaan Oosterling, Nieuw-Vennep; Johannes Philippus Hooftman, Hoofddorp, both of Netherlands

[73] Assignee: H. Vissers N.V., Nieuw-Vennep, Netherlands

[22] Filed: Feb. 26, 1973

[21] Appl. No.: 335,660

[30] Foreign Application Priority Data
Mar. 1, 1972 Netherlands.................. 7202731

[52] U.S. Cl.................................. 239/689, 138/172
[51] Int. Cl.............................................. A01c 3/06
[58] Field of Search ........... 239/689, 688; 138/172, 138/177, DIG. 11

[56] References Cited
UNITED STATES PATENTS
1,928,009  9/1933  Dornier.............................. 138/177
1,993,883  3/1935  Heddon........................... 138/177 X
2,261,912  11/1941 Buente............................... 138/177
3,298,696  1/1967  Vissers........................... 239/689 X FOREIGN PATENTS OR APPLICATIONS
5,750   4/1886  Great Britain..................... 138/172
807,124 1/1937  France.............................. 138/172

Primary Examiner—M. Henson Wood, Jr.
Assistant Examiner—John J. Love
Attorney, Agent, or Firm—Snyder, Brown & Ramik

[57] ABSTRACT

A device for spreading distributable material, for example powdery or granular fertilizer, comprising a hopper and a reciprocatory swinging, driven distribution pipe joining the open bottom side of said hopper for accelerating and ejecting the distributable material, in which the wall thickness of the distribution pipe preferably made from plastic decreases in the direction towards the outlet opening and the upstanding wall portions substantially perpendicular to the plane of the swinging motion is reinforced by armouring wires or fibres extending in the direction of length of the pipe.

4 Claims, 5 Drawing Figures

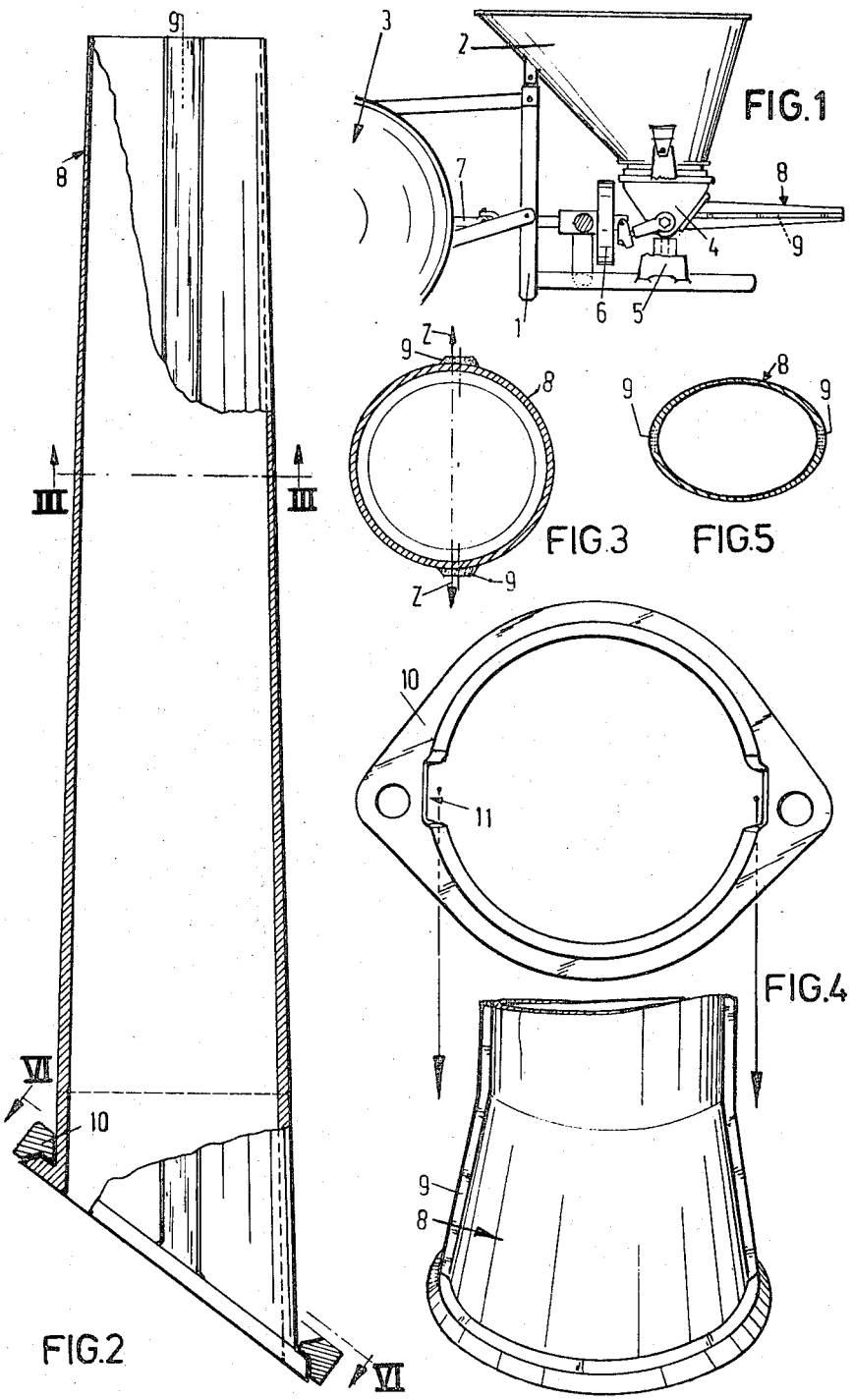

SPREADING DEVICE COMPRISING A RECIPROCATORY SWINGING DISTRIBUTION PIPE

The invention relates to a device for spreading distributable material, for example, powdery or granular fertilizer, comprising a hopper and a reciprocatory sweeping, driven distribution pipe communicating with the open bottom side of said hopper for accelerating and ejecting the distributable material.

In accordance with the present tendency to cover ever increasing working width by an agricultural implement, it is endeavoured with the existing fertilizer distributors provided with a reciprocatory swinging distribution pipe either to lengthen these pipes or to increase the frequency of the swinging movements. However, this has an adverse effect on a quiet operation of the device, since the increasing masses and speeds transfer such vibrations to the frame and to the tractor carrying said frame that the device may be damaged and even risks may be involved for the tractor driver.

The invention has for its object to provide a distribution pipe with which such vibrations do not occur or, at least, are considerably reduced, whilst nevertheless a large working width can be covered.

The invention provides for this purpose a distribution device in which the wall thickness of the distribution pipe decreases in the direction towards the outlet opening.

Owing to the decrease in wall thickness the mass per unit length of the pipe decreases according as the distance from the centre of rotation of the pipe increases. Since the inertia forces are determined by the square of said distance, the counteracting inertia forces will be considerably reduced, which results in correspondingly smaller forces exerted on the tractor or on the device.

For given materials, for example, synthetic resin, of which the pipe is made, it is advantageous to reinforce each of the wall portions substantially perpendicular to the swinging plane by armouring wires or fibres extending in the direction of length of the pipe. This involves the advantage that the remaining portion of the wall can even be thinner, because the required strength is provided by said armoured wall portions. Using synthetic resin as material for the pipe has the additional advantage that due to low coefficient of friction and to the elastic property, the fertilizer is hurled away farther than in the known distribution pipes.

When the distribution pipe is mounted with the aid of a separate flange, it is preferred to thicken the wall outwardly at the area of the armouring wires in order to enable visual perception of the correct disposition of the pipe so that the reinforced wall portions are located in the plane of the swinging movements. In order to lock the pipe in this position, the connecting flange may be provided with recesses for holding the thickened parts.

The invention will be set out with reference to the drawing, in which

FIG. 1 is a side elevation of a spreading device comprising a reciprocatory swinging distribution pipe, FIG. 2 is a sectional view and partly an elevation of a distribution pipe in accordance with the invention, FIG. 3 is a sectional view taken on the line III—III of the distribution pipe of FIG. 2, however, on a reduced scale, FIG. 4 illustrates a mode of mounting of the distribution pipe embodying the invention with the aid of a separate flange, FIG. 5 is a cross sectional view of the distribution pipe differing from that of FIG. 3.

FIG. 1 shows a hopper 2, supported from a frame 1 and containing fertilizer or other distributable material. In the embodiment shown the frame 1 is carried by a tractor, only the rear wheel 3 of which is shown. On the bottom side of the hopper 2 a hollow, conical body 4 adapted to rotate about a shaft 5 joins the hopper. A driving mechanism 6, actuated by the power take-off shaft 7 of the tractor, converts the rotary movement of the power take-off shaft 7 into a reciprocatory swinging motion or oscillatory motion of the conical body 4.

The distribution pipe 8 is fastened to the side of the conical body remote from the tractor.

From FIG. 2 it will be apparent that the wall thickness of the distribution pipe decreases in the direction towards the outlet end, that is to say, to the right in this Figure.

Reference numeral 9 designates a group of armouring wires or fibres embedded in the wall portions of the distribution pipe 8 which are substantially perpendicular to the plane of the swinging motion. It is thought here that the plane of the swinging motion passes through the centre line of the distribution pipe 8 of FIG. 2 and is at right angles to the plane of the drawing. In FIG. 3 this plane of the swinging motion is indicated by the arrows Z–Z.

When the distribution pipe 8 has to be arranged with the aid of a connecting flange 10 (see FIG. 4) on the conical body 4, there is a risk of incorrect mounting of the distribution pipe with its reinforced wall portions with respect to the sweeping movements to be performed by the distribution pipe. This may, of course, give rise to break-down. In order to enable satisfactory visual orientation it is preferred to thicken the reinforced wall portions outwardly (see a.o. FIG. 3). Although in the embodiment shown this thickening extends throughout the length of the distribution pipe 8, it may as well be provided over only part of the length.

It is particularly preferred to maintain the thickening at the area of the inlet end, since in this case the thickened parts can be locked in position in recesses 11 of the flange 10 so that the correct position is maintained.

Although in a given cross section the wall thickness of the distribution pipe 8 is shown to be constant throughout its circumference, (see FIG. 3), it is also possible to provide a distribution pipe having locally different wall thicknesses in cross sections, that is to say, the thickened parts at the area of the armouring wires may gradually change into thinner wall portions on the top and bottom sides of the distribution pipe. Within the scope of the invention it is, of course, also possible to use an oval section instead of a circular section, the larger main axis of the oval lying in the plane of the swinging motions Z–Z.

What is claimed is:

1. A device for spreading particulate material such as granular fertilizer, which comprises:
    hopper means for containing a supply of material to be distributed and including a body portion rotatably mounted for rotation about an upstanding axis and adapted to be fed with supply material;
    drive means connected to said body portion for oscillating said body portion about said axis; and an elongate and elastic distribution pipe having a proximal end connected to and in communication with said body portion and a distal end remote from said axis whereby said distal end of the pipe whips back and forth in a plane perpendicular to said axis to fling and distribute the particulate material over a wide area, said distribution pipe being made of plastic material and having a wall thickness which decreases from its proximal to its distal ends whereby materially to diminish inertia loading on the pipe.

2. A device for spreading particulate material as defined in claim 1 including reinforcing means extending longitudinally of said distribution pipe from said proximal end to said distal end thereof and along opposite sides of said distribution pipe to lie in said plane of oscillation.

3. A device for spreading particulate material as defined in claim 2 wherein said reinforcing means comprises reinforcing wires along each side of said distribution pipe and longitudinally extending ribs embedding said wires.

4. A device for spreading particulate material as defined in claim 3 including a mounting flange detachably securing the proximal end of said distribution pipe to said body portion, said mounting flange having diametrically opposed notches receiving portions of said ribs whereby particularly to locate said ribs in the plane of oscillation.

* * * * *